United States Patent
Gao et al.

(10) Patent No.: US 7,393,186 B2
(45) Date of Patent: Jul. 1, 2008

(54) MULTI-STAGE COMPRESSOR

(75) Inventors: Xiufeng Gao, Xi'an (CN); In Kyu Kim, Jinhae-shi (KR); Kyeong Ho Kim, Changwon-shi (KR); Young Joo Bae, Changwon-shi (KR); Yongzhang Yu, Xi'an (CN); Shiyu Feng, Xi'an (CN)

(73) Assignee: LG Electronics Inc., Seoul (KR)

( * ) Notice: Subject to any disclaimer, the term of this patent is extended or adjusted under 35 U.S.C. 154(b) by 509 days.

(21) Appl. No.: 10/514,116

(22) PCT Filed: May 31, 2002

(86) PCT No.: PCT/KR02/01041

§ 371 (c)(1),
(2), (4) Date: Nov. 12, 2004

(87) PCT Pub. No.: WO03/102416

PCT Pub. Date: Dec. 11, 2003

(65) Prior Publication Data

US 2005/0201868 A1  Sep. 15, 2005

(51) Int. Cl.
  *F04B 25/00* (2006.01)
  *F04B 17/00* (2006.01)

(52) U.S. Cl. .............. 417/246; 417/254; 417/266; 417/415

(58) Field of Classification Search .............. 417/254, 417/273, 266, 246, 415; 91/493; 92/72, 92/140, 138, 136, 169.1
See application file for complete search history.

(56) References Cited

U.S. PATENT DOCUMENTS

| | | | |
|---|---|---|---|
| 4,906,110 A * | 3/1990 | Van Wyk et al. | 384/463 |
| 5,252,045 A | 10/1993 | Shinoto et al. | |
| 5,560,103 A * | 10/1996 | Harris et al. | 29/898.05 |
| 5,846,059 A | 12/1998 | Mizuno et al. | |
| 5,879,145 A | 3/1999 | Baumgartner et al. | |
| 2002/0012592 A1 * | 1/2002 | Nishikawa et al. | 417/269 |

FOREIGN PATENT DOCUMENTS

| | | |
|---|---|---|
| DE | 2248137 | 4/1974 |
| DE | 3028170 A | 3/1982 |
| JP | 2001-304124 A | 10/2001 |

* cited by examiner

*Primary Examiner*—Devon Kramer
*Assistant Examiner*—Jessica L Frantz
(74) *Attorney, Agent, or Firm*—Birch, Stewart, Kolasch & Birch, LLP

(57) ABSTRACT

A multi-stage compressor is disclosed, which comprises: two motion converters driven by one driving shaft and converting a rotary motion to a straight-line reciprocating motion; first and second pistons (62) connected to one of the motion converters in opposite directions and moving reciprocatively in a straight line; and third and fourth pistons (72) connected to the other one of the motion converters in opposite directions, arranged at a predetermined angle with respect to the first and second pistons (62), and moving reciprocatively in a straight line, and which is characterized in that at least two of the four pistons operate for first-stage compression and at least one of the others operate for second-stage compression.

9 Claims, 4 Drawing Sheets

MULTI-STAGE COMPRESSOR

TECHNICAL FIELD

The present invention relates to a multi-stage compressor, and more particularly, to a reciprocating type multi-stage compressor having four cylinders.

BACKGROUND ART

There are positive displacement type compressors and centrifugal type compressors in the compressors used in refrigerators and air conditioners. In the displacement type compressors, there are reciprocating type, rotary type, scroll type, and screw type, in light of structure, in which, basically, a gas pressure is boosted by reducing volume of drawn gas.

The centrifugal compressor increases a moving speed of gas by rotating an impeller, and transforms a kinetic energy of the gas to a pressure in a diffuser fitted to an outlet of the impeller. In the reciprocating type compressors, there are connecting rod type, scotch yoke type, and plunger type depending on a mechanism that reciprocates the piston.

A related art multi-stage compressor will be explained, with reference to FIGS. 1 and 2. For obtaining a high pressure compressed gas, while an excessive temperature rise of the compressed gas is prevented, a multi-stage type compressor is employed, in general, three, or four stages, with four cylinders. FIGS. 1 and 2 illustrate related art three stage four cylinder compressor systems in related art multi-stage compressor systems, schematically.

Referring to the drawings, the three stage four cylinder compressor system is provided with two first stage compression cylinders 60, one-second stage compression cylinder 70, and one third stage compression cylinder 80.

Of the different stages of cylinders, the two first stage cylinders 60 may be arranged adjacently as shown in FIG. 1, or oppositely as shown in FIG. 2. In view of piston movement, the two first stage compression pistons 62 in the three stage compression system in FIG. 1 have a 90 degree phase difference of movement, and the two first stage compression pistons 62 in the three stage compression system in FIG. 2 have a 180 degree phase difference of movement. The second stage compression piston 72 and the third stage compression piston 82 are arranged at positions remained after the two first stage compression pistons 62 are arranged.

In the meantime, the three or four stage four cylinder compression system requires means for converting rotational movement transmitted from driving means, such as a motor, or an engine, to a linear reciprocating movement. Since a scotch yoke mechanism has been often used as such movement converting means in the related art, a related art scotch yoke type compressor will be explained, with reference to FIG. 3.

The related art scotch yoke type compressor is provided with in general a crank shaft 10, a crank pin 20, a sliding block 30, a frame 40, and one or more than one piston 50.

The crank shaft 10 is connected to a driving shaft of driving means (not shown), such as a motor, or an engine, and the crank pin 20 is connected to the crank shaft 10, for revolving along a fixed circular locus around the crank shaft 10 as the crank shaft 10 is rotated. The sliding block 30, rotatably coupled to the crank pin 20, moves on a fixed plane along a fixed locus as the crank pin 10 moves, and the frame 40, enclosing the sliding block 30 to impose a certain limitation to the movement of the sliding block 30, reciprocates in one direction according to the movement of the sliding block 30.

The piston 50 fixed to the frame 40 draws and compresses a gas in a cylinder (not shown) as the frame 40 reciprocates.

A structure of the sliding block 30 fitted to an inside of the frame 40 will be explained in detail.

The frame 40 has one pair of parallel buffer plates 31 fitted to opposite two inside surfaces thereof, each supported on a plurality of springs 33 having both ends fixed to the inside surface thereof and the buffer plate 31. There is the sliding block 30 between the one pair of buffer plates 31, and there are a plurality of rolling needle bearings 35 between the sliding block 30 and each of the buffer plates 31. The sliding block 30 and the rolling needle bearings, and the buffer plate 31 and the rolling needle bearings 35 are pressed by the plurality of springs 33 by appropriate pressures to make close contact to each other. U.S. Pat. No. 5,846,059 discloses a structure of a scotch yoke similar to the foregoing structure.

The operation of the foregoing scotch yoke type compressor will be explained.

When the crank pin 20 is revolved along a fixed circular locus around the crank shaft 10 as the crank shaft 10 is rotated upon reception of a driving force from the driving means, the sliding block 30, rotatably coupled to the crank pin 20, also revolves around the crank shaft 10, too. Since rotation of the frame 40 is held back by the piston 50 having one end fixed to the frame 40 and the other end placed in the cylinder, rotation of the sliding block 10 is held back by the buffer plates 31 and the rolling needle bearing 35 fitted to the frame 40. Therefore, the sliding block 30 is revolved around the crank shaft 10 while maintaining a fixed angle with the frame 40.

As the sliding block 30 moves while maintaining a fixed angle with the frame 40, i.e., the sliding block 30 makes no rotational movement with respect to the frame, the movement of the sliding block 10 may be analyzed into a translational motion in a movement direction of the piston 50, and a translational motion in a direction parallel to the buffer plates 31. The translational motion in the direction parallel to the buffer plates 31 is not transmitted to the frame 40 by action of the rolling needle bearing 35. However, since the translational motion in the movement direction of the piston 50 is transmitted to the frame 40, the frame 40 reciprocates in the movement direction of the piston 50. One or more than one piston 50 fixed to an outside of the frame 40 reciprocates to draw or compress a gas as the frame 40 reciprocates. When two pistons 50 are fitted to outside of the frame 40 oppositely, movements of the two pistons 50 have a 180 degree phase difference.

If two scotch yokes are coupled to the same crank pin, with movement directions of the pistons fixed to each of the scotch yokes made different from one another by a predetermined angle, four pistons each making a reciprocating movement having a fixed phase difference from a reciprocating movement of an adjacent piston will be obtained. Accordingly, it is possible that one driving unit is made to drive four pistons at a time. Taking the problem of vibration into account, it is preferable the angle is 90 degrees, when movement of each of the pistons has a 90 degree phase difference from movement of the adjacent piston.

The foregoing related art multi-stage compressor has the following problems.

The three stage four cylinder compression system requires flow passages from the two first stage compression cylinders to the second stage compression cylinder, and from the second stage compression cylinder to the third stage compression cylinder inside of the compressor for providing the three stage compression, which requires a complicate inside structure, is difficult to fabricate, and costs high. The four stage four cylinder compression system has the same problem.

In the meantime, the structure of the scotch yoke used often in the related art multi-stage compressor has the following problems.

First, lubrication is required between the rolling needle bearings, the buffer plates, and the sliding block for assuring proper movements and appropriate wear, and cooling elements heated by friction. Therefore, it is required to apply grease to the parts, which is however leaks to contaminate other components, or mixed with the compressing gas.

Second, consequently, it is required to maintain air tightness for prevention of the grease leakage, which is, not only difficult, but also requires additional cost.

Third, appropriate setting, or selection of a pre-locking force, and a stiffness of the springs, is difficult.

If the pre-locking force is too small, the rolling needle bearings do not roll, to cause sliding friction, of which friction force is greater than the rolling friction force, that causes a poor efficiency. Opposite to this, if the pre-locking force is to great, putting excessively great force to the rolling needle bearings, defective operation and short lifetime of the rolling needle bearings are caused.

Moreover, if the spring is too soft, a position of the sliding block relative to the frame varies any time, resulting in a difficulty in maintaining a clearance between the piston and the cylinder at a proper level. Opposite to this, if the spring is too stiff, it is difficult to adjust a position of the frame for setting the clearance between the piston and the cylinder to the proper level, and, if an environmental temperature rises, an excessive force is applied to the buffer plates and the rolling needle bearing due to thermal expansion of the springs.

DISCLOSURE OF INVENTION

The object of the present invention devised for solving the foregoing problems lies on providing a multi-stage compressor, which can resolve the problems of difficulty in fabrication and high production cost caused by four stage four cylinder compression system.

Another object of the present invention is to provide a structure of a scotch yoke for a compressor, which can prevent leakage of grease from a source, for preventing contamination of mechanical components and gas being compressed.

Further object of the present invention is to provide a structure of a scotch yoke for a compressor, which can resolve difficulties in setting, or selecting a pre-locking force and stiffness of a spring.

To achieve the objects of the present invention, there is provided a multi-stage compressor including two movement converting means driven by the same driving shaft for converting a rotating movement to a linear reciprocating movement, first, and second pistons connected to one of the two movement converting means in opposite directions for making linear reciprocating movements, and third, and fourth pistons connected to the other one of the two movement converting means in opposite directions and arranged at an angle to the first and second pistons for making linear reciprocating movements, wherein at least two of the first to fourth pistons are operative as first stage compression pistons, and at least one of the rest of the pistons are operative as a second stage compression piston.

In another aspect of the present invention, there is provided a multi-stage compressor having a scotch yoke including a crank shaft, a crank pin connected to the crank shaft so as to revolve around the crank shaft along a circular locus as the crank shaft rotates, a frame having one pair of sliding surfaces on parallel opposite inside surfaces thereof for fixing one or more than one piston to an outside of the sliding surface, a sliding block rotatably coupled to the crank pin and arranged between the one pair of sliding surfaces, and one pair of self-lubricating members attached to the sliding block so as to be in surface to surface contact with a facing surface of the one pair of sliding surfaces.

BEST MODE FOR CARRYING OUT THE INVENTION

Preferred embodiments of the present invention, which can achieve the objects of the present invention, will be explained, with reference to the attached drawings. Parts the same with the related art will be given the same names and symbols, and iterative explanation of which will be omitted.

Figure 4:
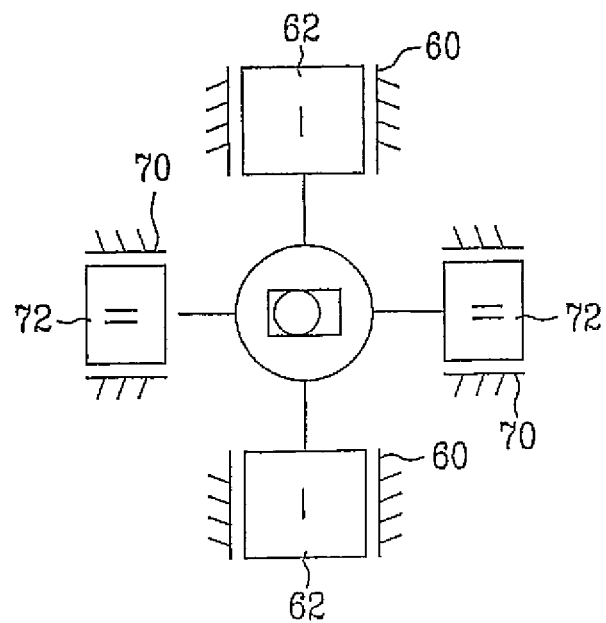
FIG. 4 illustrates a multi-stage compressor in accordance with a first preferred embodiment of the present invention, schematically.

FIG. 4 illustrates a multi-stage compressor in accordance with a first preferred embodiment of the present invention schematically, referring to which the multi-stage compressor of the present invention will be explained.

The first embodiment multi-stage compressor has a two stage four cylinder compression system. Of the four cylinders, two cylinders are for first stage compression cylinders 60, and rest two cylinders are second stage compression cylinders 70. In this embodiment, the two first stage compression cylinders 60 are arranged to opposite each other, i.e., the movements of the two first stage compression pistons 62 have 180 degrees of phase difference. Therefore, the movement of the two second stage compression pistons 72 also have 180 degrees of phase difference.

Figure 5:
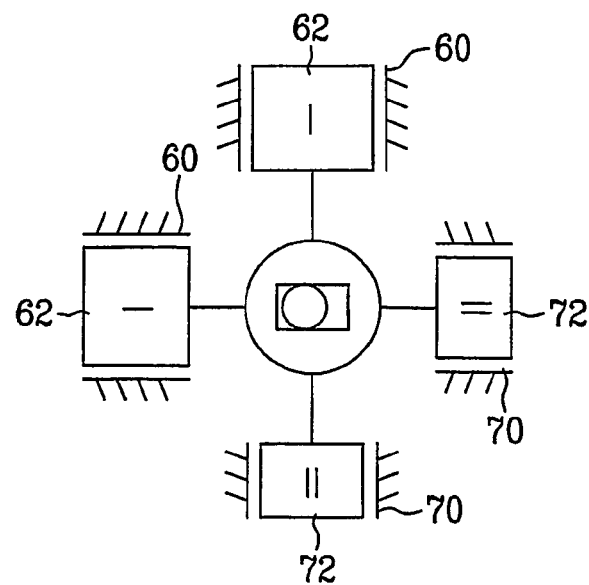
FIG. 5 illustrates a multi-stage compressor in accordance with a second preferred embodiment of the present invention, schematically.

FIG. 5 illustrates a multi-stage compressor in accordance with a second preferred embodiment of the present invention schematically, referring to which the multi-stage compressor of the present invention will be explained.

Alike the first embodiment, the second embodiment multi-stage compressor has a two stage four cylinder compression system having two first stage compression cylinders 60 and two second stage compression cylinders 70, except that the first two compression cylinders 60 are arranged adjacently, i.e., the movements of the two first stage compression pistons 62 have 90 degrees of phase difference. Therefore, the movement of the two second stage compression pistons 72 also have 90 degrees of phase difference.

Though it is not described in the foregoing two embodiments, the four cylinders may consist of three first stage cylinders 60 and one second stage cylinder 70, and it is not required necessarily that the angle between adjacent pistons are 90 degrees.

Figure 6:
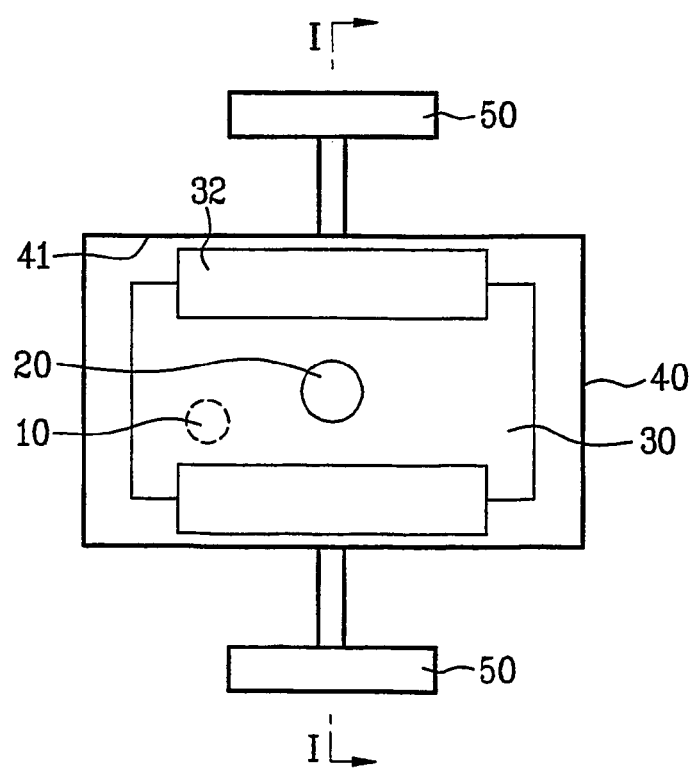
FIG. 6 illustrates a plan view of a scotch yoke structure in accordance with a first preferred embodiment of the present invention, schematically.

FIG. 6 illustrates a plan view of a scotch yoke structure in accordance with a first preferred embodiment of the present invention, referring to which the scotch yoke for a compressor of the present invention will be explained.

Figure 1:
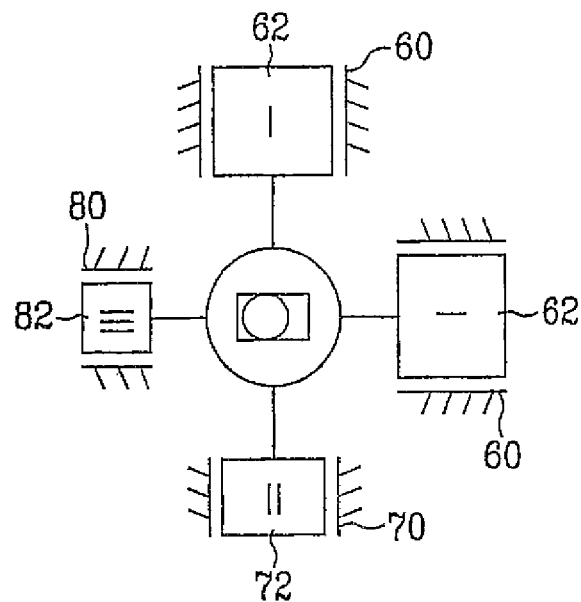
FIGS. 1 and 2 illustrate plan views each showing a related art three stage four cylinder compressor systems in related art multi-stage compressor systems, schematically.
Figure 2:
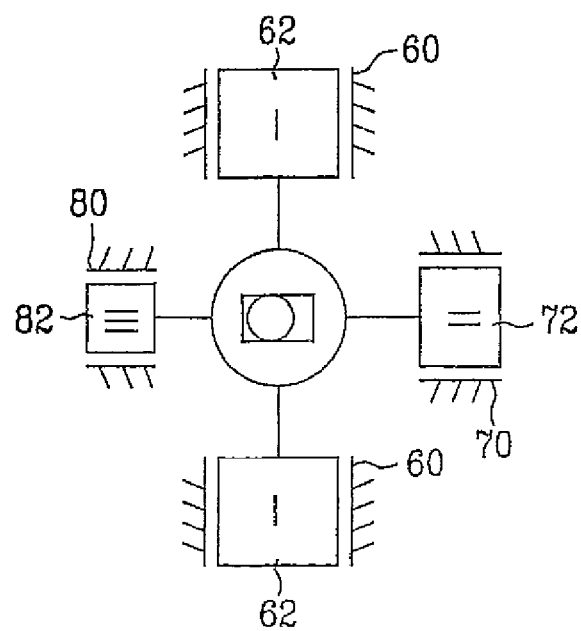
Figure 3:
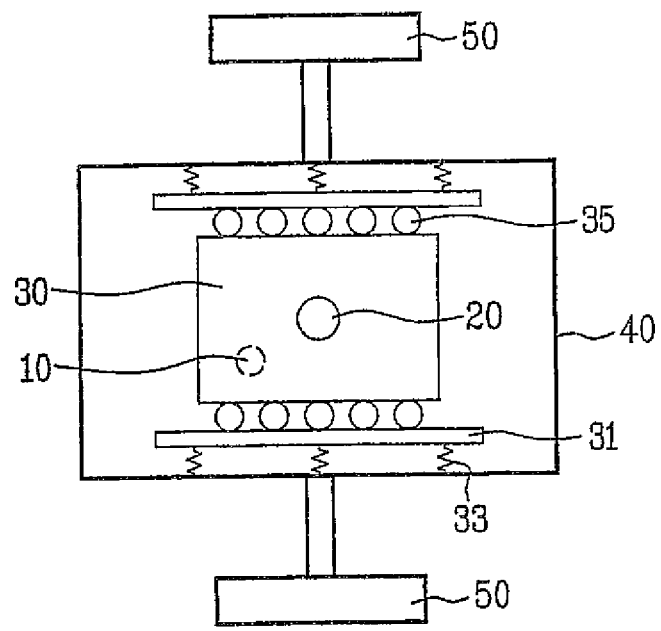
FIG. 3 illustrates a plan view of a yoke structure of a related art scotch yoke type compressor, schematically.

In this embodiment, self lubricating members 32, which can substitute functions of the buffer plates 31, the rolling bearings 35, and the springs 33 for supporting the buffer plates, in the related art as shown in FIG. 3, are attached to the sliding block 30 in place of the buffer plate 31 such that the self lubricating members 32 are in contact with an inside surface of the frame 40. The self-lubricating member 32 is formed of a solid lubricant, such as graphite.

The inside surface of the frame 40 has a sliding surface 41 the self-lubricating member 32 is in contact thereto. The sliding surface 41 may be the inside surface of the frame 40 itself, or preferably, depending on material of the frame 40, the inside surface of the frame 40 machined smoothly by a milling machine or the like, for facilitating smooth movement of the sliding block 30. When the sliding surface 41 is machined, it is preferable that the machining surface extends large enough to include entire movement region of the sliding block.

Though the self-lubricating members 32 are attached to the sliding block 30, and the sliding surface 41 is formed on the frame 40 in this embodiment, the same effect can be obtained even if the self-lubricating member is attached to the frame 40, and the sliding surface is formed on a surface of the sliding block 30 the self-lubricating member are in contact thereto.

Figure 7:
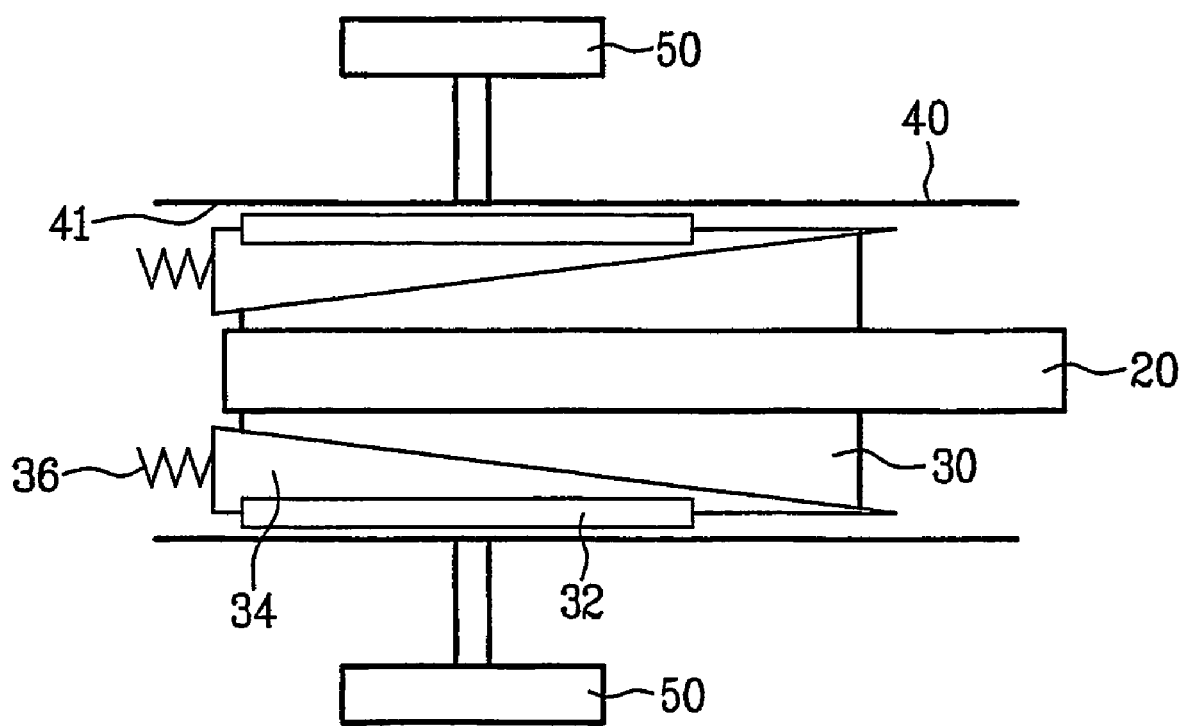
FIG. 7 illustrates a section of a scotch yoke structure in accordance with a second preferred embodiment of the present invention, across a part corresponding to the I-I section in FIG. 6, schematically.

FIG. 7 illustrates a section of a scotch yoke structure in accordance with a second preferred embodiment of the present invention, referring to which the scotch yoke for a compressor of the present invention will be explained.

Though the objects of the present invention can be achieved satisfactorily by the scotch yoke structure in accordance with the first preferred embodiment of the present invention shown in FIG. 6, the self-lubricating member 32 may wear down as time passed, to form a gap between the sliding block and the frame, that causes a problem in maintaining a proper clearance between the piston 50 and the cylinder.

This embodiment is a modified version of the first embodiment for prevention of such a problem, by providing a wedge member 34 between the sliding block 30 and the frame 40. The self-lubricating member 32 is attached to one of sloped surfaces of the wedge member 34 opposite to the sliding surface 41 of the frame 40, so as to be in contact with the sliding surface 41.

In the meantime, for maintaining a proper gap between the sliding block 30 and the frame 40, and thereby maintaining a proper clearance between the piston 50 and the cylinder too, it is required that the wedge member 34 having the self-lubricating member 32 attached thereto is pressed both to the sliding block 30 and the sliding surface 41. For this, it is required that there is an elastic member 36, such as a spring, and the like, having one end fixed to the wedge member 34 and the other end fixed to a predetermined part, so that the spring is compressed by a certain amount to provide an appropriate initial reaction force.

For pressing the wedge member 34 both to the sliding block 30 and the sliding surface 41, it is preferable that the surface the sliding block 30 is in contact with the wedge member 34 is, not parallel to the sliding surface 41, but is sloped. It is also preferable that the wedge member 34 is fitted such that a wedge end of the wedge member 34 is directed to the crank shaft 10.

In this embodiment too, the same effect can be obtained even if the self-lubricating member is attached, not to the wedge member 34, but to the frame 40, and the sliding surface is formed on the wedge member 34.

It will be apparent to those skilled in the art that various modifications and variations can be made in the present invention without departing from the spirit or scope of the invention. For an example, besides the scotch yoke explained in the foregoing embodiments, movement converting means for converting a rotating movement into a linear reciprocating movement, such as a combination of a crank shaft, a connecting rod, and a piston, or a mechanism constructed by a combination of a plurality of plungers and pistons may be employed in the multi-stage compressor of the present invention. Thus, it is intended that the present invention cover the modifications and variations of this invention provided they come within the scope of the appended claims and their equivalents.

INDUSTRIAL APPLICABILITY

As has been explained, the multi-stage compressor of the present invention has the following advantages.

Since the multi-stage compressor of the two stage four cylinder compression system of the present invention only requires two flow passages from the first stage compression cylinder to the second stage compression cylinder in the compressor, an internal system required for the flow passage is made simple, to permit an easy fabrication and a low cost.

Moreover, the lower torque requirement for the driving means, such as a motor, or an engine, in comparison to three, or four stage compression system permits employment of smaller driving means, that permits fabrication of a smaller compressor integrated with the driving means, and to have a low compressor operation cost.

In the meantime, the scotch yoke of the present invention has the following advantages.

First, the replacement of the buffer plates, the rolling needle bearings, and the springs with the self-lubricating members can dispense with grease, thereby preventing contamination of other components, and the gas being compressed by the compressor by leaked grease from the source.

Accordingly, the cleaning requirement of an inside of the compressor caused by leakage of the grease can be eliminated, and the prevention of mix of the grease with gas can prevents deterioration of an efficiency caused by accumulation of foreign matter, not only at the compressor, but also at an evaporator, and condenser connected to the compressor in a refrigerator, a freezer, or an air conditioner using the compressor.

Second, since no springs are used, the difficulty for proper setting, or selecting of a pre-locking force, and a stiffness of the spring exists no more. Moreover, since no rolling needle bearings are used, the problem of defective operation, or early breakage of the rolling needle bearing caused by improper setting or selection of the pre-locking force or the stiffness of the spring is solved from the source.

Third, the employment of the wedge member, and the elastic member that presses the wedge member both to the sliding block and the sliding surface permits an easy setting, and maintenance of a proper clearance between the sliding block and the frame, which is favorable for maintenance of the compressor. Moreover, the preciseness of machining and assembly of related components, such as the sliding block and the frame, relatively lower than the related art saves a production cost.

What is claimed is:

1. A multistage compressor comprising:
   two movement converting scotch yoke means driven by the same driving shaft for converting a rotating movement to a linear reciprocating movement;
   first, and second pistons connected to one of the two movement converting means in opposite directions for making linear reciprocating movements; and
   third, and fourth pistons connected to the other one of the two movement converting means in opposite direction and arranged at an angle to the first and second pistons for making linear reciprocating movements,
   wherein at least two of the first to fourth pistons are operative as first stage compression pistons, and at least one of the rest of the pistons are operative as a second stage compression piston,
   wherein the two movement converting scotch yoke means includes scotch yokes, and the scotch yokes comprise one pair of wedge members each having a sloped surface, and an elastic member having one end fixed to the wedge member and the other end fixed to a predetermined position for pressing the wedge member.

2. A multi-stage compressor as claimed in claim 1, wherein, of the first to fourth pistons, two pistons are operative as first stage compression pistons, and the rest two pistons are operative as second stage compression pistons.

3. A multi-stage compressor as claimed in claim 2, wherein the angle is 90 degrees.

4. A multi-stage compressor as claimed in claim 3, wherein the two first stage compression pistons are arranged adjacently.

5. A multi-stage compressor as claimed in claim 1, wherein the scotch yoke further comprises:
   a crank shaft,
   a crank pin connected to the crank shaft so as to revolve around the crank shaft along a circular locus as the crank shaft rotates,
   a frame having one pair of sliding surfaces on parallel opposite inside surfaces thereof for fixing one or more than one piston to an outside of the sliding surface,
   a sliding block rotatably coupled to the crank pin and arranged between the one pair of sliding surfaces, and
   one pair of self-lubricating members attached to the sliding block so as to be in surface to surface contact with a facing surface of the one pair of sliding surfaces.

6. A freezer comprising a multi-stage compressor as claimed in claim 1.

7. An air conditioner comprising a multi-stage compressor as claimed in claim 1.

8. A multi-stage compressor as claimed in claim 1, wherein the scotch yoke further comprises:
   a crank shaft,
   a crank pin connected to the crank shaft so as to revolve around the crank shaft along a circular locus as the crank shaft rotates,
   a frame having one pair of sliding surfaces on parallel opposite inside surfaces thereof for fixing one or more than one piston to an outside of the sliding surface,
   a sliding block rotatably coupled to the crank pin and arranged between the one pair of sliding surfaces, and
   one pair of self-lubricating members attached to the sliding block so as to be in surface to surface contact with a facing surface of the one pair of sliding surfaces,
   wherein one surface of the each wedge member is opposite to the sliding surface and the sloped surface of the each wedge member is in surface to surface contact with the sliding block.

9. A multi-stage compressor composing:
   two movement converting scotch yoke means driven by the same driving shaft for converting a rotating movement to a linear reciprocating movement;
   first, and second pistons connected to one of the two movement converting means in opposite directions for making linear reciprocating movements; and
   third, and fourth pistons connected to the other one of the two movement converting means in opposite directions and arranged at an angle to the first and second pistons for making linear reciprocating movements,
   wherein at least two of the first to fourth pistons are operative as first stage compression pistons, and at least one of the rest of the pistons are operative as a second stage compression piston, and
   wherein the scotch yoke means comprises:
   a crank shaft,
   a crank pin connected to the crank shaft so as to revolve around the crank shaft along a circular locus as the crank shaft rotates,
   a frame having one pair of sliding surfaces on parallel opposite inside surfaces thereof for fixing one or more than one piston to an outside of the sliding surface,
   a sliding block rotatably coupled to the crank pin and arranged between the one pair of sliding surfaces, having a surface facing the sliding surface sloped at an angle to the sliding surface,
   one pair of wedge members each having a surface opposite to the sliding surface and a sloped surface in surface to surface contact with the sliding block,
   one pair of self-lubricating members each attached to the sliding block so as to be in surface to surface contact with the sliding surface, and
   an elastic member having one end fixed to the wedge member and the other end fixed to a predetermined position for pressing the wedge member having the self-lubricating member attached thereto both to the sliding block and the sliding surface.

* * * * *